(No Model.)

J. T. TITUS.
HOSE COUPLING.

No. 319,350.  Patented June 2, 1885.

Witnesses:

Inventor:
John T. Titus
By his Atty.,

UNITED STATES PATENT OFFICE.

JOHN THADEUS TITUS, OF SAN FRANCISCO, CALIFORNIA.

HOSE-COUPLING.

SPECIFICATION forming part of Letters Patent No. 319,350, dated June 2, 1885.

Application filed January 29, 1885. (No model.)

*To all whom it may concern:*

Be it known that I, JOHN T. TITUS, a citizen of the United States, residing in the city and county of San Francisco, State of California, have invented certain new and useful Improvements in Hose-Couplings, also adapted for pipes or flexible and inflexible conductors; and I do hereby declare that the following is a full, clear, and exact description of my said invention, reference being had to the accompanying drawings, that form part of this specification.

My invention relates to interlocking couplings for uniting the adjacent ends of lengths of hose and pipes or flexible and inflexible conductors for air and liquids; and it consists in certain novel construction and combination of parts, as hereinafter fully set forth and described.

Figure 1:
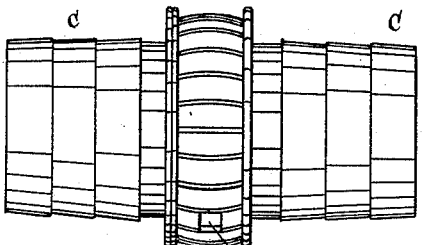
Figure 2:
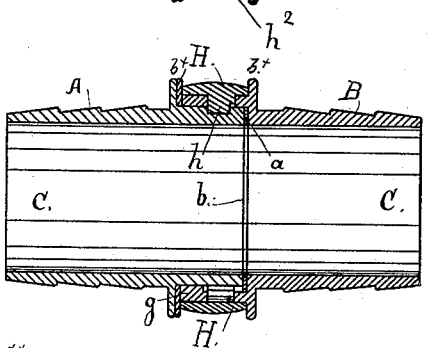
Figure 3:
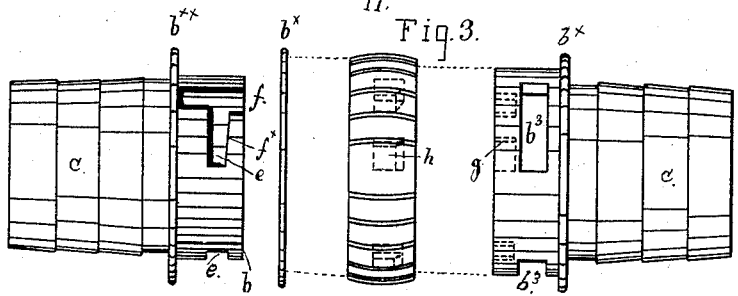
Figure 4:
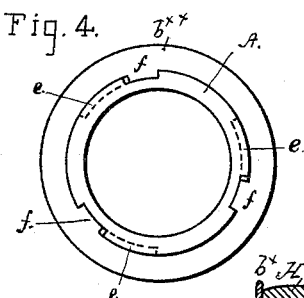
Figure 5:
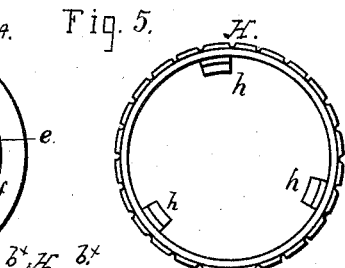
Figure 6:
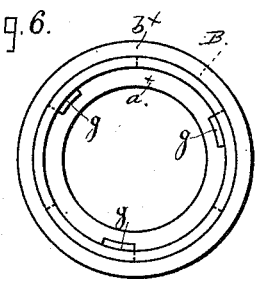
Figure 7:
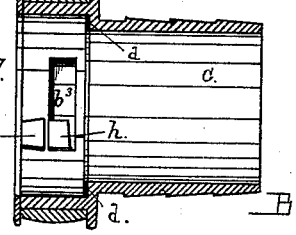

Referring to the accompanying drawings, Figure 1 is a general outside view of the coupling when locked together. Fig. 2 is a longitudinal section through Fig. 1. Fig. 3 shows the several parts separated. Fig. 4 is a front view of the male portion or half of the coupling. Fig. 5 shows the ring in front view. Fig. 6 is a front view of the female half of the coupling. Fig. 7 is a longitudinal section through this part.

A B represent two halves or parts, that may be termed the "male" and "female" part, respectively, each one having the sleeve portion C, to receive the end of the hose or pipe. In the part B is a seat, $a$, for a packing, $d$, the width of this seat being proportioned to the thickness of the end $b$ of the male part A of the coupling. In the outer face of the part A are two sets of grooves, $e\ e f f$, the ones $e\ e$ running circumferentially, and the others, $f f$, running from the bottom of the grooves $e$ transversely or lengthwise of the part A. To enter and engage these grooves there are on the other part, B, of the coupling a set of lugs or locking projections, $g\ h$, to each set of grooves. The lugs $g\ g$ are stationary, but the others, $h$, are a part of or are fixed to a revolving ring, H. This ring H is fitted to turn smoothly upon the part B between the two flanges $b^\times\ b^\times$, and its surface is milled, roughened, or otherwise finished to afford a good grasping-surface for turning it by hand. It may also be provided with depressions, as at $h^2$, to take a spanner-wrench. The projections $h\ h$ enter and work through slots $b^3$ in the coupling-body B to engage the grooves $e$ in the male part, into which grooves they enter by passing first into the grooves $f f$ when the two parts A B are brought together. Rotation of the ring at such time throws the projections $h$ around into and to the ends of the grooves $e$. One edge of the groove is an incline, as at $f^\times$, and the corresponding edge of the lug or projection to engage with it is also inclined, so that the movement of one upon the other will draw the two parts of the coupling tightly together and press the end of the male part A against its seat $a$ in the other part. The projections $g$ and $h$ in each set are so arranged with respect to each other that they are brought into line to enter the longitudinal slot $f$ by turning the ring H around until the projection $h$ strikes the end of the slot $b^3$, when the two lugs $g\ h$ are thrown into line. In this construction I have employed three sets of these grooves and locking projections at equal distances apart; but this number may be varied as circumstances may require without affecting the character or scope of my invention, as the essential features therein are the stops or projections $g$ and the grooves $f$, to hold the parts from turning upon each other, and the lugs or projections $h$ and the grooves $e$, to lock the parts together.

Having thus fully described my invention, what I claim, and desire to secure by Letters Patent, is—

1. A hose-coupling consisting of the part A, having the longitudinal grooves $f$ and transverse grooves $e$, and the part B, into which the part A is adapted to enter, a seat, $b$, projections $g$, movable lugs or projections $h$, and a revolving ring, H, to which the lugs $h$ are secured as a means of throwing the lugs, substantially as described.

2. The combination of the part A, provided with the grooves $e f\ e f$, with the part B, provided with the projections $g\ g$, and the movable ring H, provided with the projections $h\ h$, substantially as set forth.

3. In a two-part coupling, the part A, provided with the grooves described, the part B, having the circumferential slots $b^3$ and lugs $g$, and the ring H, having the lugs $h$, substantially as and for the purpose set forth.

JOHN THADEUS TITUS.

Witnesses:
EDWD. E. OSBORN,
JNO. L. TAGGARD.